(12) United States Patent
Shim et al.

(10) Patent No.: US 9,121,392 B2
(45) Date of Patent: Sep. 1, 2015

(54) GEOTHERMAL POWER GENERATION SYSTEM AND METHOD USING HEAT EXCHANGE BETWEEN WORKING FLUID AND MOLTEN SALT

(71) Applicant: KOREA INSTITUTE OF GEOSCIENCE AND MINERAL RESOURCES, Daejeon (KR)

(72) Inventors: Byoung Ohan Shim, Daejeon (KR); Hyoung Chan Kim, Daejeon (KR); Chanhee Park, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 65 days.

(21) Appl. No.: 13/718,916

(22) Filed: Dec. 18, 2012

(65) Prior Publication Data

US 2014/0102094 A1 Apr. 17, 2014

(30) Foreign Application Priority Data

Oct. 17, 2012 (KR) ........................ 10-2012-0115346

(51) Int. Cl.
*F03G 7/04* (2006.01)
(52) U.S. Cl.
CPC .. *F03G 7/04* (2013.01); *Y02E 10/10* (2013.01)
(58) Field of Classification Search
CPC .............. F25B 30/06; F25B 27/00; F24J 3/08
USPC .................. 60/641.2, 641.8–641.15
See application file for complete search history.

(56) References Cited

U.S. PATENT DOCUMENTS 3,857,244 A * 12/1974 Faucette ........................ 60/641.2
4,071,079 A * 1/1978 Engelbrecht .................. 165/48.1
(Continued)

FOREIGN PATENT DOCUMENTS

JP          2008248837       10/2008
KR    1020120003234 A        1/2012
(Continued)

OTHER PUBLICATIONS

Jung Ryun Lee & Joon Hong Boo, Design of a Solar Thermal Storage System Employing Heat Pipes and Molten Salts, vol. 31 No. 1, Apr. 7, 2011, School of Aerospace and Mechanical Engineering, Korea Aerospace University.

*Primary Examiner* — Thomas Denion
*Assistant Examiner* — Shafiq Mian
(74) *Attorney, Agent, or Firm* — Maxon IP LLC; Justin H. Kim

(57) ABSTRACT

A geothermal power generation system using heat exchange between working fluid and molten salt includes a heat collecting unit. A plurality of molten salt containing units are disposed in the ground at predetermined intervals from each other. A heat exchanging unit transfers a heat source of the heat collecting unit to the molten salt in the plurality of molten salt containing units. A plurality of working fluid containing units respectively surround the molten salt containing units and are disposed in the ground at predetermined intervals from each other. A turbine unit is connected to the plurality of working fluid containing units, and generates mechanical energy using steam energy that is generated by the plurality of working fluid containing units. A power generating unit is connected to the turbine unit, and generates electrical energy using the mechanical energy.

7 Claims, 8 Drawing Sheets

(56) References Cited

U.S. PATENT DOCUMENTS

| | | | | |
|---|---|---|---|---|
| 4,214,170 | A * | 7/1980 | Leonard | 290/1 R |
| 7,343,753 | B2 * | 3/2008 | Kidwell et al. | 62/260 |
| 7,363,769 | B2 * | 4/2008 | Kidwell et al. | 62/260 |
| 8,176,971 | B2 * | 5/2012 | McClung, III | 165/45 |
| 8,833,475 | B2 * | 9/2014 | Saar et al. | 166/402 |
| 8,881,805 | B2 * | 11/2014 | Klemencic | 166/245 |
| 2004/0206103 | A1 * | 10/2004 | Wiggs | 62/260 |
| 2006/0201180 | A1 * | 9/2006 | Kidwell et al. | 62/260 |
| 2007/0029067 | A1 * | 2/2007 | Kidwell et al. | 165/45 |
| 2008/0209933 | A1 * | 9/2008 | Kidwell et al. | 62/260 |
| 2009/0211727 | A1 * | 8/2009 | Yin et al. | 165/45 |
| 2010/0031653 | A1 * | 2/2010 | Foppe | 60/641.3 |
| 2010/0243201 | A1 * | 9/2010 | McClung, III | 165/45 |
| 2011/0162362 | A1 * | 7/2011 | Steiner | 60/641.15 |
| 2011/0232858 | A1 * | 9/2011 | Hara | 165/45 |
| 2011/0259547 | A1 * | 10/2011 | Kidwell et al. | 165/45 |
| 2012/0098277 | A1 * | 4/2012 | Petty | 290/1 R |
| 2012/0124998 | A1 * | 5/2012 | Newman | 60/641.2 |
| 2012/0193924 | A1 * | 8/2012 | Okazaki | 290/55 |
| 2012/0216536 | A1 * | 8/2012 | Ma et al. | 60/641.8 |
| 2013/0025278 | A1 * | 1/2013 | Batscha | 60/641.2 |

FOREIGN PATENT DOCUMENTS

| | | |
|---|---|---|
| KR | 1020120054199 A | 5/2012 |
| KR | 101166684 B1 | 7/2012 |

* cited by examiner

GEOTHERMAL POWER GENERATION SYSTEM AND METHOD USING HEAT EXCHANGE BETWEEN WORKING FLUID AND MOLTEN SALT

BACKGROUND OF THE INVENTION

1. Field of the Invention

The present invention relates, in general, to a geothermal power generation system and method using heat exchange between working fluid and molten salt, and more particularly, to a geothermal power generation system and method which can generate electricity by causing molten salt in which waste heat or solar heat is stored to exchange heat with working fluid.

2. Description of the Related Art

Geothermal power generation is a type of power generation that generates electricity by accepting heat in the form of steam or hot water from a hot subterranean layer. Subterranean heat is a type of energy that is contained in hot water, hot rocks or the like found underground in regions ranging from relatively shallow regions to regions located several kilometers beneath the surface of the Earth.

When hot steam is obtained from these underground regions, the hot steam is introduced to a steam turbine to rotate the turbine at a high speed, so that a power generator connected to the turbine generates electricity. If the steam which erupts from underground contains only a small amount of moisture, it can be sent directly to the turbine. If the steam erupts along with a large amount of hot water, the hot water is sent to a heat exchanger in which the water is vaporized and is then sent to the turbine as steam. In addition, when water has a low temperature, a liquid that has a lower boiling point is vaporized and is then sent to the turbine.

Geothermal power generation does not need fuel in principle and is a clean energy source that is free from pollution attributable to the combustion of fuel. However, noncondensable gas that erupts from a geothermal well contains a small amount of hydrogen sulfide. The eruption of hydrogen sulfide is not problematic at present since the concentration of hydrogen sulfide is low and below environmental standards. However, desulfurization equipment will be required if a large amount of hydrogen sulfide erupts in the future. In addition, after power generation, all of the hot water is returned to the underground region from whence it came since it contains a small amount of arsenic. However, if an economical dearsenic technology is established, the hot water will also be usable after power generation as a valuable low-temperature thermal energy resource.

The majority of costs for geothermal power generation include a cost for construction of a geothermal power plant and a cost for excavation of a geothermal well. The costs for geothermal power generation vary depending on the quality and type of geothermal power generation. Geothermal power generation has an advantage of economic competitiveness, although a typical geothermal power plant has a smaller scale than a thermal power plant or an atomic power plant. Geothermal power generation is also characterized as a small and locally-distributed energy source.

FIG. 1 a schematic view showing the configuration of a geothermal power generation system using high-temperature and high-pressure compressed air.

In an example, Korean Patent Application No. 10-2010-0115466 introduces a geothermal power generation system using high-temperature and high-pressure compressed air. As shown in FIG. 1, in the system of this application, a cooling unit which reduces temperature is removed from a rear end of a compressor 4, and artificial geothermal power generation is carried out using the characteristic of high-temperature and high-pressure compressed air that is produced by the compressor 4. In this fashion, the efficiency of the power generation using the compressed air can be improved.

FIG. 2 is a schematic view showing the configuration of a geothermal power generation system of the related art.

In addition, Korean Patent Application No. 10-2010-0063987 introduces a low-temperature geothermal power generation system. As shown in FIG. 2, the geothermal power generation system of this application includes a superheater 20, a post pressure pump 40 and a preheater 60 in order to carry out geothermal power generation using geothermal water having a temperature of 100° C. or less. In this system, it is possible to increase the efficiency of a carburetor 4 by increasing the temperature and enthalpy of secondary fluid by a predetermined degree by actuating the preheater 60 using the remaining heat of geothermal water that is supplied from the carburetor 4, increase pressure by increasing the temperature of the secondary fluid that is vaporized by the superheater 20, and increase the efficiency of the carburetor 4 and maintain the flow rate of the superheater 20 by increasing the pressure of the secondary fluid that is introduced into a turbine 6 by the post pressure pump 40 and decreasing the pressure of the superheater 20. Therefore, this system can effectively generate electricity using geothermal water that has a relatively low temperature.

In geothermal power generation, hot water or steam that has been drawn up from underground is not renewable energy in the strictest sense. Since the amount of subterranean heat that leaks during geothermal power generation is greater than the recharging capacity of a reservoir, the amount of heat stored beneath the surface of the Earth is currently reducing. Although it will take a long time, when subterranean hot water or steam is exhausted and hot rock layers are cooled, no heat can be drawn up from underground any longer. It is necessary to develop an alternative energy system which can be used in geothermal power generation to convert other types of energy into geothermal energy.

SUMMARY OF THE INVENTION

Accordingly, the present invention has been made keeping in mind the above problems occurring in the related art, and the present invention is intended to propose a geothermal power generation system and method using heat exchange between working fluid and molten salt which can generate electricity by storing waste heat or solar heat in molten salt and then rotating a turbine via heat exchange between working fluid and the molten salt.

In order to achieve the above object, according to one aspect of the present invention, there is provided a geothermal power generation system using heat exchange between working fluid and molten salt. The geothermal power generation system includes a heat collecting unit; a plurality of molten salt containing units which contain molten salt therein, the plurality of molten salt containing units being disposed in the ground at predetermined intervals from each other; a heat exchanging unit which transfers a heat source of the heat collecting unit to the molten salt in the plurality of molten salt containing units; a plurality of working fluid containing units which contains working fluid therein, the working fluid being transferred via heat exchange, the plurality of working fluid containing units respectively surrounding the molten salt containing units and being disposed in the ground at predetermined intervals from each other; a turbine unit connected to the plurality of working fluid containing units, the turbine unit generating mechanical energy using steam energy that is generated by the plurality of working fluid containing units; and a power generating unit connected to the turbine unit, the power generating unit generating electrical energy using the mechanical energy.

In an exemplary embodiment, the heat collecting unit may be implemented as a flat panel-shaped heat collecting tube.

In an exemplary embodiment, each of the plurality of molten salt containing units may be implemented as a linear tube having an upper section connected to the heat exchanging unit and a lower section inserted into the ground.

In an exemplary embodiment, each of the plurality of working fluid containing units may be implemented as a U-shaped tube having an upper section exposed above the ground and a lower section inserted into the ground.

Here, each of the plurality of working fluid containing units may include a spiral fin which is attached to an outer circumference of the U-shaped tube so as to increase a heat dissipation area.

In an exemplary embodiment, the plurality of working fluid containing units may have an integral structure in which the adjacent U-shaped tubes are connected to each other.

According to another aspect of the present invention, there is provided a geothermal power generation system using heat exchange between working fluid and molten salt. The geothermal power generation system may include a heat collecting unit; a plurality of molten salt containing units which contain molten salt therein, the plurality of molten salt containing units being disposed in the ground at predetermined intervals from each other; a heat exchanging unit which transfers a heat source of the heat collecting unit to the molten salt in the plurality of molten salt containing units; a plurality of working fluid containing units which contains working fluid therein, the working fluid being transferred via heat exchange, the plurality of working fluid containing units respectively surrounding the molten salt containing units and being disposed in the ground at predetermined intervals from each other; a latent heat collecting unit which is disposed in the ground while surrounding the plurality of molten salt containing units and plurality of working fluid containing units, the latent heat collecting unit collecting latent heat that is produced following phase changes in the molten salt; a first turbine unit connected to the plurality of working fluid containing units, the first turbine unit generating mechanical energy using steam energy that is generated by the plurality of working fluid containing units; a second turbine unit connected to the latent heat collecting unit, the second turbine unit generating mechanical energy using steam energy that is generated by the latent heat collecting unit; a first power generating unit connected to the first turbine unit, the first power generating unit generating electrical energy using the mechanical energy of the first turbine unit; and a second power generating unit connected to the second turbine unit, the second power generating unit generating electrical energy using the mechanical energy of the second turbine unit.

In an exemplary embodiment, each of the plurality of working fluid containing units may be implemented as a U-shaped tube having an upper section exposed above the ground and a lower section inserted into the ground, the U-shaped tube having a spiral fin attached to an outer circumference thereof so as to increase a heat dissipation area.

In an exemplary embodiment, the latent heat collecting unit may employ a Rankine cycle in which heat exchange is carried out by circulating water.

In an exemplary embodiment, the latent heat collecting unit may employ a Brayton cycle in which heat exchange is carried out by circulating gas.

According to a further aspect of the present invention, there is provided a geothermal power generation method using heat exchange between working fluid and molten salt. The geothermal power generation method includes the following steps of: collecting a heat source into a heat collecting unit; transferring the heat source of the heat collecting unit to molten salt via heat exchange; transferring the heat source of the molten salt to working fluid via heat exchange; generating mechanical energy using steam energy of the working fluid; and generating electricity using the mechanical energy.

According to further another aspect of the present invention, there is provided a geothermal power generation method using heat exchange between working fluid and molten salt. The geothermal power generation method includes the following steps of: collecting a heat source into a heat collecting unit; transferring the heat source of the heat collecting unit to molten salt via heat exchange; transferring the heat source of the molten salt to working fluid via heat exchange; collecting latent heat via heat exchange, the latent heat being produced following phase changes of the molten salt; generating mechanical energy using steam energy of the working fluid and steam energy that is generated by the latent heat; and generating electricity using the mechanical energy.

According to the geothermal power generation system and method using heat exchange between working fluid and molten salt according to the invention, it is possible to generate electricity by storing waste heat or solar heat in molten salt and then rotating the turbine via heat exchange between working fluid and the molten salt.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
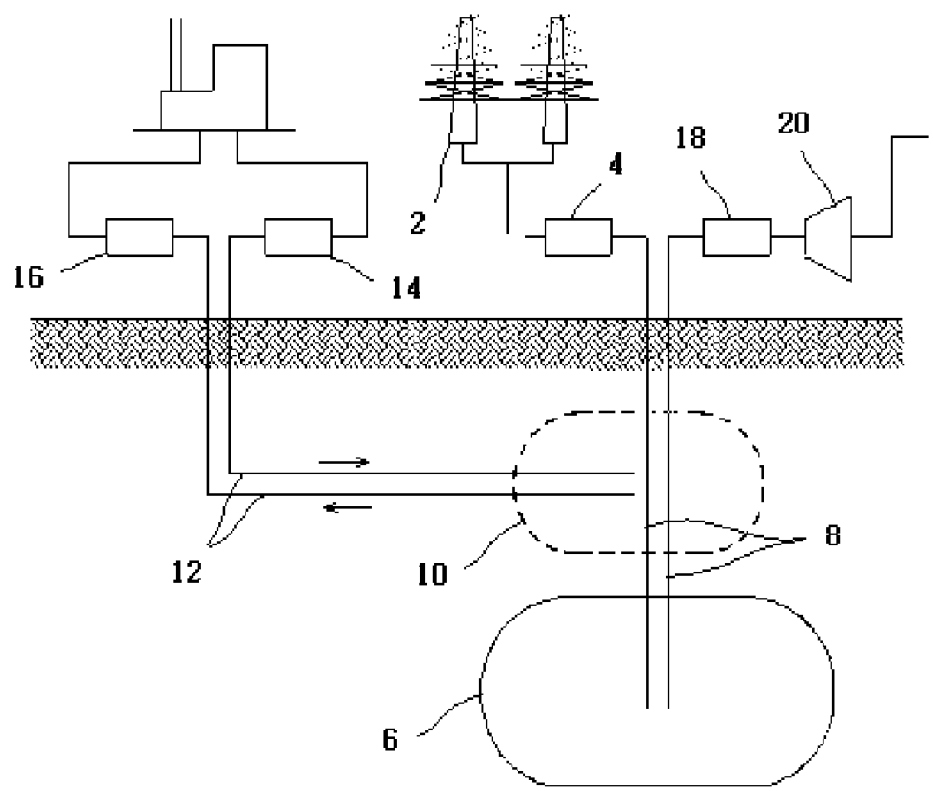
FIG. 1 a schematic view showing the configuration of a geothermal power generation system using high-temperature and high-pressure compressed air.
Figure 2:
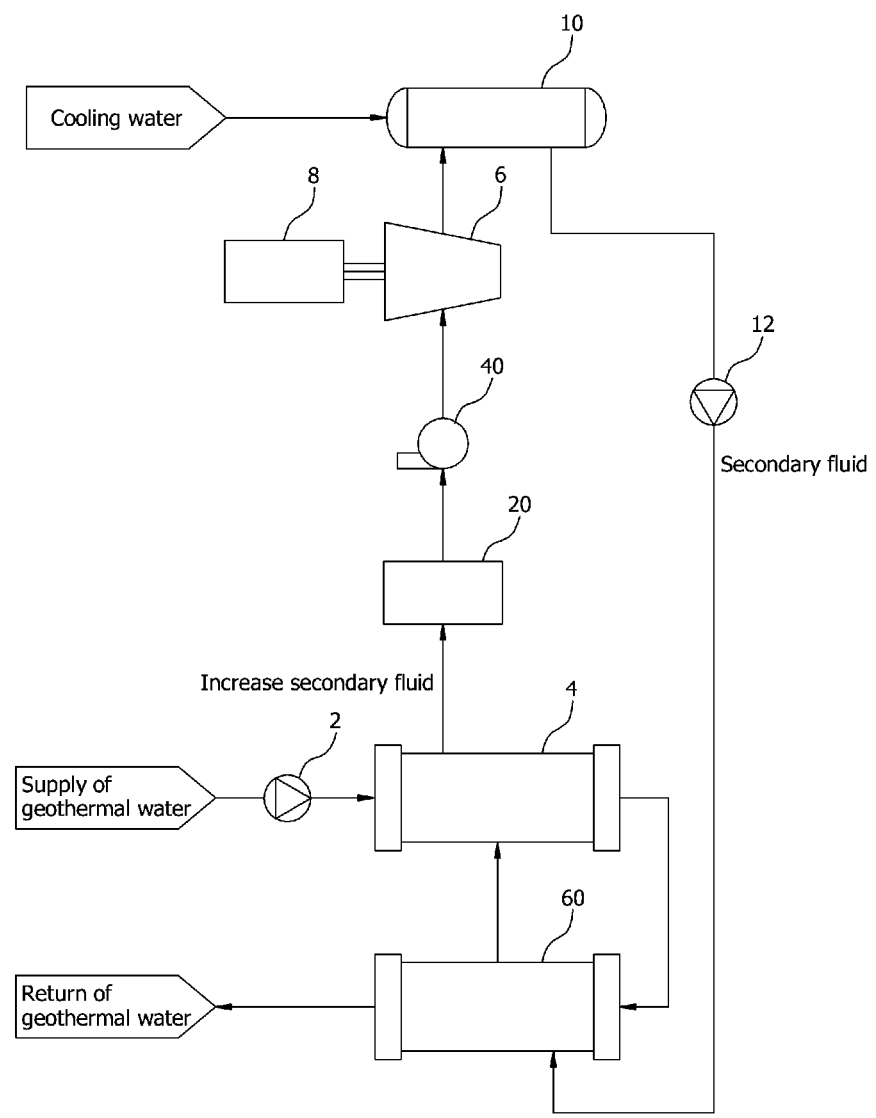
FIG. 2 is a schematic view showing the configuration of a geothermal power generation system of the related art.

Reference will now be made in greater detail to an exemplary embodiment of the present invention, an example of which is illustrated in the accompanying drawings. Wherever possible, the same reference numerals will be used throughout the drawings and the description to refer to the same or like parts. In the following description of the present invention, detailed descriptions of known functions and components incorporated herein will be omitted when they may make the subject matter of the present invention unclear.

Figure 3:
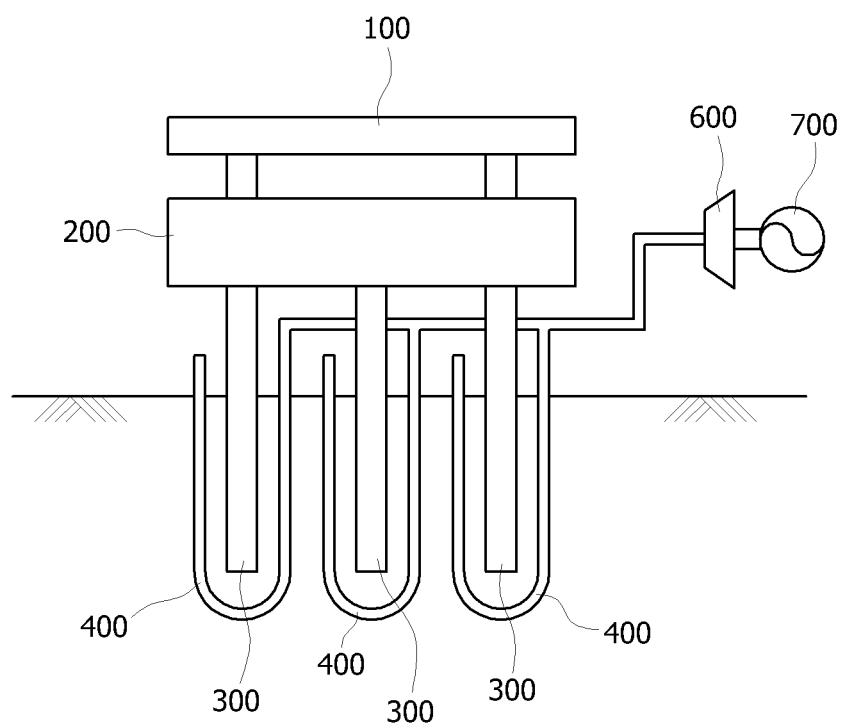
FIG. 3 is a configuration view showing a geothermal power generation system using heat exchange between working fluid and molten salt according to a first exemplary embodiment of the present invention.

FIG. 3 is a configuration view showing a geothermal power generation system using heat exchange between working fluid and molten salt according to a first exemplary embodiment of the present invention.

As shown in FIG. 3, the geothermal power generation system using heat exchange between working fluid and molten salt according to the first exemplary embodiment of the present invention includes a heat collecting unit 100, a heat exchanging unit 200, a plurality of molten salt containing units 300, a plurality of working fluid containing units 400, a turbine unit 600 and a power generating unit 700.

The heat collecting unit 100 may be implemented as a heat collecting tube having the shape of a flat panel which can collect waste heat or solar heat.

In an example, in order to collect solar heat, the heat collecting unit 10 can be configured such that a transparent outer layer which allows light to pass through surrounds a black inner structure. With this structure, the heat collecting unit 10 can convert solar energy into heat energy.

Specifically, when light energy from the sun enters the interior of the flat heat collecting tube, the light energy is converted into infrared (IR) radiation while colliding against the black inner structure. Since the IR radiation does not pass through the transparent outer layer, the inside becomes gradually hotter. In addition, water can flow inside the flat heat collecting tube, and absorb a heat source that has been collected inside the flat heat collecting tube so that the heat source can be transferred to the heat exchanging unit 200 which will be described later.

The heat exchanging unit 200 can transfer the heat source in the heat collecting unit 10 to molten salt in the molten salt containing units 300 which will be described later via heat exchange, thereby heating the molten salt.

The molten salt containing units 300 contain the molten salt therein, and can be disposed in the ground at predetermined intervals from each other.

Specifically, each of the molten salt containing units 300 can be configured as a linear tube. The upper section of the molten salt containing unit 300 is connected to the heat exchanging unit 200 such that the molten salt can receive the heat source from the heat exchanging unit 200, and the lower section of the molten salt containing unit 300 is inserted into the ground such that the heat source of the molten salt can be transferred underground.

The working fluid containing units 400 contain therein working fluid which receives the heat source of the molten salt via heat exchange. The working fluid containing units 400 can be disposed in the ground at predetermined intervals from each other while respectively surrounding the molten salt containing units 300.

Specifically, each of the working fluid containing units 400 can be configured as a U-shaped tube with the upper section thereof being exposed above the ground and the lower section thereof being inserted into the ground. The U-shaped tube can be configured such that an inlet thereof which is exposed above the ground is opened and an outlet thereof is connected to the turbine unit 600.

Here, the working fluid that is contained in the working fluid containing unit 400 can be water. The working fluid can be contained inside the tube through the inlet, and be heated when the heat source in the molten salt containing units 300 or in the underground region is transferred thereto, so that steam that is produced via vaporization of the working fluid can flow into the turbine unit 600 via the outlet.

Figure 4:
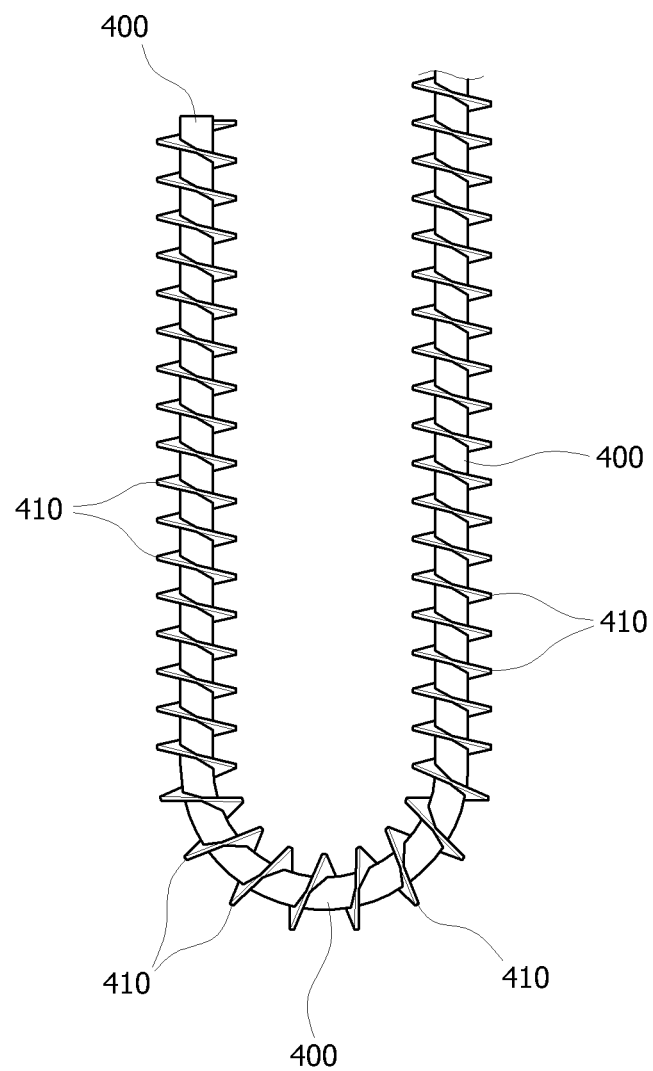
FIG. 4 is a configuration view of one of the working fluid containing units shown in FIG. 3.

FIG. 4 is a configuration view of one of the working fluid containing units 400 shown in FIG. 3.

As shown in FIG. 4, the working fluid containing unit 400 can have a spiral fin 410 on the outer circumference of the U-shaped tube. The spiral fin 410 can increase the heat transfer area of the working fluid containing unit 400, thereby increasing the efficiency at which the working fluid is heated.

Figure 5:
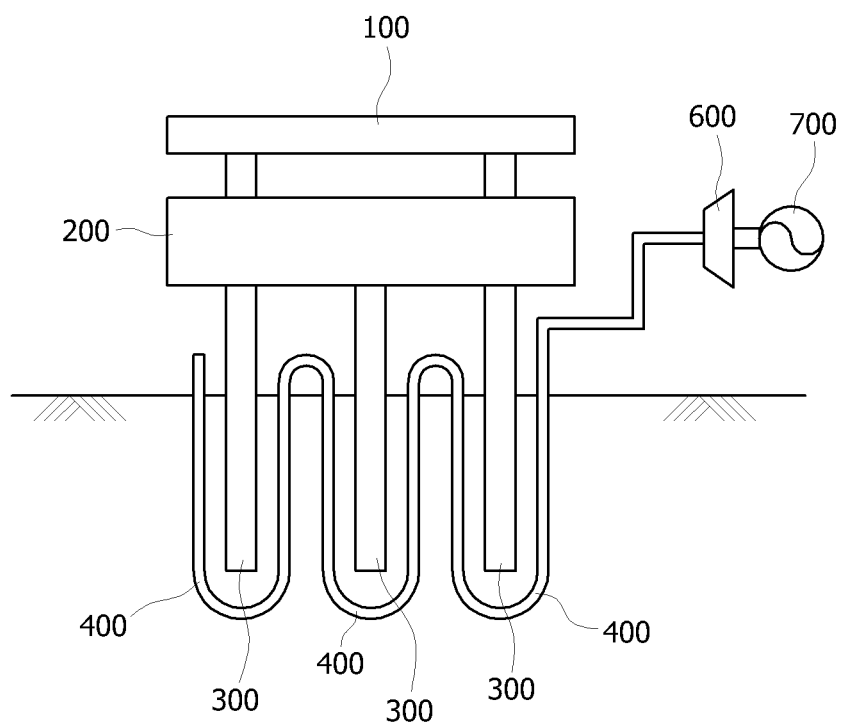
FIG. 5 is a view showing a configuration in which a plurality of working fluid containing units which are integrally connected to each other according to the present invention.

FIG. 5 is a view showing a configuration in which a plurality of working fluid containing units which are integrally connected to each other according to the present invention.

In addition, the plurality of working fluid containing units 400 can be formed as an integral part in which the U-shaped tubes are connected to each other. Specifically, as shown in FIG. 5, the working fluid containing units 400 can be configured such that the inlet of the first U-shaped tube is opened, the outlet of one U-shaped tube is connected to the inlet of the adjacent U-shaped tube, and the outlet of the final U-shaped tube is connected to the turbine unit 600 which will be described later.

The working fluid is contained inside the tube through the outlet of the first U-shaped tube. The working fluid can be heated by the heat source in the molten salt containing units 300 or the heat source in the underground region which is transferred thereto so that steam that is produced by vaporization of the heated working fluid can flow to the turbine unit 600 through the outlet of the final U-shaped tube.

The turbine unit 600 is connected to the working fluid containing unit 400, and can generate mechanical energy using the energy of the steam that has been produced in the working fluid containing units 400.

The power generating unit 700 is connected to the turbine unit 600, and can generate electrical energy using the mechanical energy.

A detailed description will be given below of a geothermal power generation system using heat exchange between working fluid and molten salt according to a second exemplary embodiment of the present invention.

Figure 6:
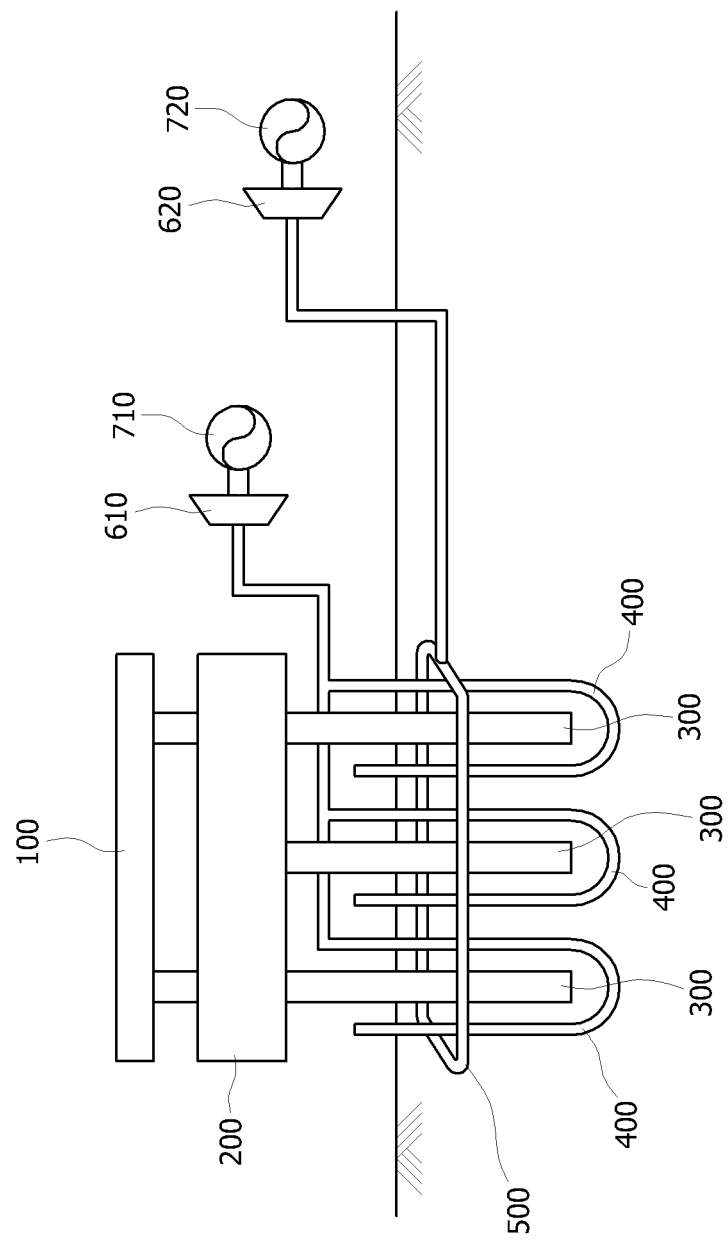
FIG. 6 is a configuration view showing a geothermal power generation system using heat exchange between working fluid and molten salt according to a second exemplary embodiment of the present invention.

FIG. 6 is a configuration view showing the geothermal power generation system using heat exchange between working fluid and molten salt according to the second exemplary embodiment of the present invention.

As shown in FIG. 6, the geothermal power generation system using heat exchange between working fluid and molten salt according to the second exemplary embodiment of the present invention includes a heat collecting unit 100, a heat exchanging unit 200, a plurality of molten salt containing units 300, a plurality of working fluid containing units 400, a latent heat collecting unit 500, a first turbine unit 610, a second turbine unit 620, a first power generating unit 710 and a second power generating unit 720.

Detailed descriptions of the heat collecting unit 100, the heat exchanging unit 200, the plurality of molten salt containing units 300 and the plurality of working fluid containing units 400 will be omitted since they have the same configuration and function as the heat collecting unit, the heat exchanging unit, the molten salt containing units and the working fluid containing units of the geothermal power generation system using heat exchange between working fluid and molten salt according to the first embodiment of the present invention.

The latent heat collecting unit 500 is disposed underground while surrounding the molten salt containing units 300 and the working fluid containing units 400 such that it can collect latent heat via heat exchange, the latent heat being produced by phase changes in the molten salt.

Specifically, the latent heat collecting unit 500 can employ the Rankine cycle in which heat exchange is carried out by circulating water as a first example. The latent heat collecting unit 500 can collect latent heat via heat exchange by circulating water accompanied with phase changes between steam and liquid through adiabatic compression, isobaric heating, adiabatic expansion and isobaric heat dissipation.

In addition, as a second example, the latent heat collecting unit 500 can employ the Brayton cycle in which heat exchange is carried out by circulating gas. The latent heat collecting unit 500 can collect latent heat via heat exchange by circulating compressed gas, and then produce combustion gas by injecting fuel thereto.

The first turbine unit 610 is connected to the working fluid containing units 400, and can generate mechanical energy using the energy of steam that is produced by the working fluid containing units 400.

The second turbine unit 620 is connected to the latent heat collecting unit 500, and can generate mechanical energy using the energy of the steam that is produced in the latent heat collecting unit 500.

The first power generating unit 710 is connected to the first turbine unit 610, and can generate electrical energy using the mechanical energy.

The second power generating unit 720 is connected to the second turbine unit 620, and can generate electrical energy using the mechanical energy.

A detailed description will be given below of a geothermal power generation method using heat exchange between working fluid and molten salt according to the first exemplary embodiment of the present invention.

Figure 7:
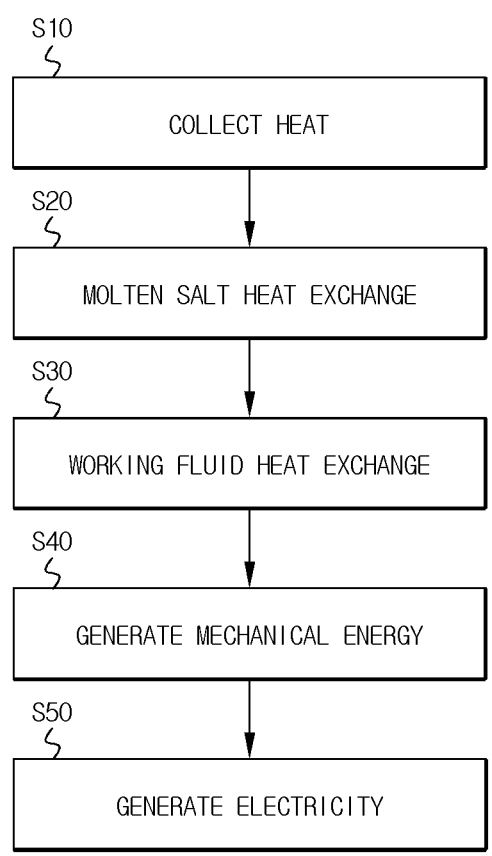
FIG. 7 is a block diagram showing a geothermal power generation method using heat exchange between working fluid and molten salt according to the first exemplary embodiment of the present invention.

FIG. 7 is a block diagram showing the geothermal power generation method using heat exchange between working fluid and molten salt according to the first exemplary embodiment of the present invention.

As shown in FIG. 7, the geothermal power generation method using heat exchange between working fluid and molten salt according to the first exemplary embodiment of the present invention includes a heat collecting step S10, a molten salt heat exchanging step S20, a working fluid heat exchanging step S30, a mechanical energy generating step S40 and an electricity generating step S50.

The heat collecting step S10 is the step of collecting heat sources to the heat collecting unit 100 shown in FIG. 3. The heat collecting step S10 can collect waste heat or solar heat to the heat collecting unit 100 which is implemented as a flat heat collecting tube.

The molten salt heat exchanging step S20 is the step at which the heat collecting unit 100 transfers heat sources to molten salt via heat exchange.

Specifically, at the molten salt heat exchanging step S20, the heat exchanging unit 200 can heat molten salt in the molten salt containing units 300 by transferring heat sources in the heat collecting unit 100 to the molten salt.

The working fluid heat exchanging step S30 is the step of transferring heat sources of the molten salt to working fluid via heat exchange.

Specifically, at the working fluid heat exchanging step S30, it is possible to transfer heat sources of the molten salt to working fluid inside the working fluid containing units 400. The working fluid can be contained inside the working fluid containing units 400 through the inlets thereof, be heated by heat sources in the molten salt containing units 300 or in the underground region, and be then vaporized to generate steam energy.

The mechanical energy generating step S40 is the step at which the turbine unit 600 generates mechanical energy using the steam energy of the working fluid.

The electricity generating step S50 is the step at which the power generating unit generates electrical energy using the mechanical energy.

A detailed description will be given below of a geothermal power generation method using heat exchange between working fluid and molten salt according to the second exemplary embodiment of the present invention.

Figure 8:
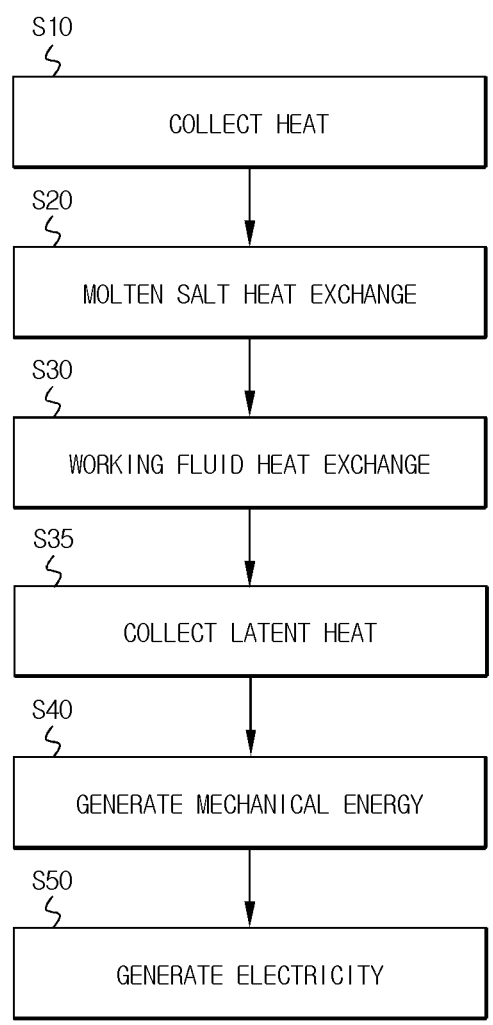
FIG. 8 is a block diagram showing a geothermal power generation method using heat exchange between working fluid and molten salt according to the second exemplary embodiment of the present invention.

FIG. 8 is a block diagram showing the geothermal power generation method using heat exchange between working fluid and molten salt according to the second exemplary embodiment of the present invention.

As shown in FIG. 8, the geothermal power generation method using heat exchange between working fluid and molten salt according to the second exemplary embodiment of the present invention includes a heat collecting step S10, a molten salt heat exchanging step S20, a working fluid heat exchanging step S30, a latent heat collecting step S35, a mechanical energy generating step S40 and an electricity generating step S50.

Detailed descriptions of the heat collecting step S10, the molten salt heat exchanging step S20 and the working fluid heat exchanging step S30 will be omitted since they have the same flows and functions as the collecting step, the molten salt heat exchanging step and the working fluid heat exchanging step of the geothermal power generation method using heat exchange between working fluid and molten salt according to the first exemplary embodiment of the present invention.

The latent heat collecting step S35 is the step of collecting latent heat via heat exchange, the latent heat being produced following phase changes in molten salt.

Specifically, at the latent heat collecting step S35, the latent heat collecting unit 500 which is disposed underground while surrounding the molten salt containing units 300 and the working fluid containing units 400, as shown in FIG. 6, can collect the latent heat that is generated following phase changes in the molten salt. The latent heat collecting unit 500 can collect the latent heat via heat exchange by circulating water or gas.

The mechanical energy generating step S40 is the step at which the first turbine unit 610 generates mechanical energy using the energy of the steam of the working fluid or the second turbine 620 generates mechanical energy using the energy of steam that is produced by latent heat.

The electricity generating step S50 is the step at which the first power generating unit 710 and the second power generating unit 720 generate power using the mechanical energy.

Although the geothermal power generation system and method using heat exchange between working fluid and molten salt according to exemplary embodiments of the present invention have been described in conjunction with the accompanying drawings, those skilled in the art will appreciate that various modifications, additions and substitutions are possible, without departing from the scope and spirit of the present invention as disclosed in the accompanying claims.

What is claimed is:
1. A power generation system using heat exchange between working fluid and molten salt, comprising:
  a heat collecting unit;
  a plurality of molten salt containing units which contain molten salt therein, the plurality of molten salt containing units disposed in ground at predetermined intervals from each other;

a heat exchanging unit which transfers a heat energy from a heat source of the heat collecting unit to the molten salt in the plurality of molten salt containing units to heat the molten salt;

a plurality of working fluid containing units which contains working fluid therein, the heat energy is transferred to the working fluid from the heated molten salt, each of the plurality of working fluid containing units surround the respective molten salt containing units and the each of the plurality of working fluid units is disposed in the ground at predetermined intervals from each other;

a turbine connected to the plurality of working fluid containing units, the turbine generating mechanical energy using steam energy that is generated by the plurality of working fluid containing units; and a power generating unit connected to the turbine, the power generating unit generating electrical energy using the mechanical energy;

wherein each of the plurality of molten salt containing units comprises a vertically linear tube having an upper section connected to the heat exchanging unit and a lower section inserted into the ground, wherein each of the plurality of working fluid containing units comprises a U-shaped tube having an upper section exposed above the ground and a lower section inserted into the ground, wherein the working fluid is contained inside the U-shaped tube, each of the U-shaped tube having an inlet and an outlet above the ground, such that each of the outlet is combined into a single outlet, and the working fluid is delivered to the U-shaped tube through the respective inlets, wherein the single outlet is connected to the turbine;

wherein the working fluid is heated by the heated molten salt or a heat source in the underground region to produce steam by vaporization of the heated working fluid in the U-shaped tube; the steam is delivered to the turbine via the outlet of the U-shaped tube to generate electric power.

2. The power generation system of claim 1, wherein the heat collecting unit comprises a flat panel-shaped heat collecting tube.

3. The power generation system of claim 1, wherein each of the plurality of working fluid containing units has a spiral fin which is attached to an outer circumference of the U-shaped tube to increase a heat dissipation area.

4. The power generation system of claim 1, wherein the plurality of working fluid containing units has an integral structure in which the U-shaped tubes adjacent to each other are connected together.

5. A power generation system using heat exchange between working fluid and molten salt, comprising:
a heat collecting unit;
a plurality of molten salt containing units which contain molten salt therein, the plurality of molten salt containing units disposed in ground at predetermined intervals from each other;

a heat exchanging unit which transfers a heat energy from a heat source of the heat collecting unit to the molten salt in the plurality of molten salt containing units to heat the molten salt;

a plurality of working fluid containing units which contains working fluid therein, the heat energy is transferred to the working fluid from the heated molten salt, each of the plurality of working fluid containing units surround the respective molten salt containing units and the each of the plurality of working fluid units is disposed in the ground at predetermined intervals from each other;

a latent heat collecting unit is disposed in the ground which surrounds the plurality of molten salt containing units and plurality of working fluid containing units, the latent heat collecting unit collecting latent heat that is produced following phase changes in the molten salt;

a first turbine connected to the plurality of working fluid containing units, the first turbine generating mechanical energy using steam energy that is generated by the plurality of working fluid containing units;

a second turbine connected to the latent heat collecting unit, the second turbine generating mechanical energy using steam energy that is generated by the latent heat collecting unit;

a first power generating unit connected to the first turbine, the first power generating unit generating electrical energy using the mechanical energy of the first turbine; and a second power generating unit connected to the second turbine, the second power generating unit generating electrical energy using the mechanical energy of the second turbine;

wherein each of the plurality of working fluid containing units comprises a U-shaped tube having an upper section exposed above the ground and a lower section inserted into the ground, the U-shaped tube having a spiral fin attached to an outer circumference thereof to increase a heat dissipation area, wherein the working fluid is contained inside the U-shaped tube, each of the U-shaped tube having an inlet and an outlet above the ground, such that each of the outlet is combined into a single outlet, and the working fluid is delivered to the U-shaped tube through the respective inlets, wherein the single outlet is connected to the turbine;

wherein the working fluid is heated by the heated molten salt or a heat source in the underground region to produce steam by vaporization of the heated working fluid in the U-shaped tube; the steam is delivered to the turbine via the outlet of the U-shaped tube to generate electric power.

6. The power generation system of claim 5, wherein the latent heat collecting unit employs a Rankine cycle in which heat exchange is carried out by circulating water.

7. The power generation system of claim 5, wherein the latent heat collecting unit employs a Brayton cycle in which heat exchange is carried out by circulating gas.

* * * * *